(12) United States Patent
Judd et al.

(10) Patent No.: US 6,360,215 B1
(45) Date of Patent: Mar. 19, 2002

(54) METHOD AND APPARATUS FOR RETRIEVING DOCUMENTS BASED ON INFORMATION OTHER THAN DOCUMENT CONTENT

(75) Inventors: Douglass R. Judd, San Jose; Paul Gauthier, San Mateo; J. Eric Baldeschwieler, San Francisco, all of CA (US)

(73) Assignee: Inktomi Corporation, Foster City, CA (US)

( * ) Notice: Subject to any disclaimer, the term of this patent is extended or adjusted under 35 U.S.C. 154(b) by 0 days.

(21) Appl. No.: 09/186,058

(22) Filed: Nov. 3, 1998

(51) Int. Cl.$^7$ .............................. G06F 7/00; G06F 17/30
(52) U.S. Cl. ...................... 707/3; 707/4; 707/7; 707/9; 707/10; 707/501; 707/513; 709/202; 382/190
(58) Field of Search ................................ 707/1, 2, 3, 4, 707/5, 10, 104, 501, 513, 6; 709/201, 203, 218, 219; 382/305

(56) References Cited

U.S. PATENT DOCUMENTS

| | | | | |
|---|---|---|---|---|
| 5,465,353 A | * | 11/1995 | Hull et al. .................. | 395/600 |
| 5,757,983 A | * | 5/1998 | Kawaguchi et al. ........ | 382/305 |
| 5,966,710 A | * | 10/1999 | Burrows ...................... | 707/103 |
| 6,026,388 A | * | 2/2000 | Liddy et al. .................... | 707/1 |
| 6,065,055 A | * | 5/2000 | Hughes ....................... | 709/229 |
| 6,065,056 A | * | 5/2000 | Bradshaw et al. .......... | 709/229 |
| 6,094,649 A | * | 7/2000 | Bowen et al. ................. | 707/3 |
| 6,122,647 A | * | 9/2000 | Horowitz et al. ........... | 707/513 |

* cited by examiner

*Primary Examiner*—Thomas Black
*Assistant Examiner*—Jacques Veillard
(74) *Attorney, Agent, or Firm*—Hickman Palermo Truong & Becker LLP; Edward A. Becker

(57) ABSTRACT

A method and apparatus are provided for retrieving documents from a collection of documents based on information other than the contents of a desired document. The collection of documents, which may be a hypertext system or documents available via the World Wide Web, is indexed. In one embodiment, an indexing process of a search engine receives one or more specifications that identify documents, or document locations, and non-content information such as a tag word or code word. The indexing process searches the index to identify all documents in the index that match one or more of the specifications. If a match is found, the tag word is added to the index, and information about the matching document is stored in the index in association with the tag word. A search query is submitted to the search engine. The search query is automatically modified to add a reference to the tag word, such as a query term that will exclude any index entry for a document associated with the tag word. The search is executed against the index, and a set of search results is generated. Accordingly, the search results automatically exclude all documents associated with the tag word. These techniques may be used, for example, to implement a Web search service that produces more accurate search results or that prevents certain documents, such as pornographic materials, from appearing in search results.

18 Claims, 10 Drawing Sheets

METHOD AND APPARATUS FOR RETRIEVING DOCUMENTS BASED ON INFORMATION OTHER THAN DOCUMENT CONTENT

FIELD OF THE INVENTION

The present invention generally relates to data processing. The invention relates more specifically to retrieving a document from among several electronic documents based on information not derived from the literal content of the document.

BACKGROUND OF THE INVENTION

Hypertext systems now enjoy wide use. One particular hypertext system, the World Wide Web ("Web"), provides global access over public packet-switched networks to a large number of hypertext documents. The Web has grown to contain a staggering number of documents, and the number of documents continues to increase. The number of documents available through the Web is so large that to use the Web in a practical way almost always requires a search service, search engine, or similar service.

Certain search engines, however, have limited utility because the search results they produce include documents that are not relevant to the search query. In particular, many search engines return search results that list documents that are not genuinely related to the search query. One reason that search engines return such poor-quality results is that the search engines are easy to deceive. The search engines use "spider" programs that "crawl" to Web servers around the world, locate documents, index the documents, and follow hyperlinks to other documents. The index may comprise a list of all words encountered by the "spider" in all the documents, in which each word in the list is associated with a reference to each of the documents that contains that word. Unfortunately, the "spiders" cannot discriminate among documents that genuinely use a particular word and documents that contain the word, but are really about something else.

For example, a Web document that contains sexually-oriented or pornographic material may also contain one or more words that are unrelated to the sexual material, but are intended to cause the document to be indexed by search engines under those words, thereby luring unsuspecting browsers to the document. A pornographic document that contains a decoy word intended to lure male viewers, such as "CORVETTE," for example, followed by sexual material, would be indexed by a search engine under the word "CORVETTE". The decoy words may be embedded in invisible metatags or rendered in white characters on a white background, so as to be invisible when the document is displayed by the browser. This practice is called "spamming" a search engine or an indexing system. Searchers who submit a query to the search engine or indexing system that seeks information about the motion picture "Bambi" would receive the pornographic page in the search results. This is undesirable and has led to criticism of the utility of search engines and indexing systems.

As a result, the search results returned by the search engine often contain references to the documents that are totally unrelated, in terms of genuine content, to the scope of a search query. In the World Wide Web context, search engines that suffer from this problem include the Yahoo!® Web site, the Excite® Web site, the Infoseek® Web site, and others.

Accordingly, in this field there is a need for a system or mechanism that can eliminate extraneous references from search engine search results.

There is a particular need for a system or mechanism that can combat "spamming" of an indexing system or search engine system.

There is also a need for a mechanism that can associate words, search terms, or editorial matter, other than words appearing in the content of a document, with the document in an index.

There is a particular need for such a system that can carry out a search for a document based on words, search terms, or editorial matter other than the literal content of a group of documents.

SUMMARY OF THE INVENTION

The foregoing needs, and other needs and objects that will become apparent from the following disclosure, are fulfilled by the present invention, which comprises, in one aspect, a method of selecting electronic documents from among a plurality of electronic documents, the method comprising the steps of storing a tag word in an index in association with information identifying an electronic document, in which the tag word comprises data that is not derived from content of the electronic document; receiving a search query; modifying the search query to create a modified search query by adding to the search query a search term that references the tag word; and creating a set of search results by searching the index based on the modified search query.

One feature of this aspect is that the step of storing includes the steps of receiving data that indicates one or more tag words and criteria to be used to determine which of the plurality of documents should be associated with each of the one or more tag words; and storing, in the index, information associating each of the one or more tag words with the documents in the index that satisfy the criteria associated with the tag words. Another feature is that the step of storing includes the steps of receiving data that indicates one or more tag words and criteria to be used to determine which of the plurality of documents should be associated with each of the one or more tag words, and in which at least a portion of the data is expressed in a wildcard format; retrieving a location identifier of each of the documents that are indexed in the index; matching each location identifier to each of the criteria; and when one location identifier matches one of the criteria, storing, in the index, information associating such location identifier with one or more of the tag words.

In another feature, the step of storing includes the steps of receiving specifications of one or more of the documents that are indexed in the index, in which each of the specifications is associated with one or more tag words, and in which one of the specifications is expressed in a wildcard format; retrieving a location identifier of each of the documents that are indexed in the index; matching each location identifier to each of the specifications by interpreting the one of the specifications that is in the wildcard format according to one or more wildcard format rules; and when one location identifier matches one of the specifications, storing, in the index, information associating such location identifier with one or more of the tag words. In another feature, storing includes the steps of storing a hash value representing the tag word in a record of the index; and storing an indirect reference to information identifying one or more of the documents that contain the tag word.

Another aspect of the invention provides a method of restricting access to an electronic document that is stored among a plurality of documents, the method comprising the steps of storing a tag word in an index in association with information identifying the electronic document, in which the tag word indicates that access to the electronic document is restricted; receiving a search query that requests the electronic document; modifying the search query to create a modified search query by adding a search term that excludes from the modified search query all documents that contain the tag word; and creating a set of search results by searching the index based on the modified search query. One feature of this aspect is that the step of modifying comprises the step of modifying, automatically and using a software component of a browser, the search query to create a modified search query by adding a search term that excludes from the modified search query all documents that contain the tag word.

Another feature of this aspect is that the modified search query selects only those electronic documents that satisfy the original search query that also contain the tag word. A related feature is that the modified search query selects only those electronic documents that satisfy the original search query that do not contain the tag word.

In another aspect, the invention provides a method of processing queries that select an electronic document from among a plurality of documents, the method comprising the steps of storing a tag word in an index in association with information identifying the electronic document, in which the tag word indicates that access to the electronic document is restricted; receiving a search query that requests the electronic document; modifying the search query to create a modified search query by adding a search term that references the tag word; and creating a set of search results by searching the index based on the modified search query.

One feature of this aspect is that the modifying step further comprises using a software component installed in a browser to perform the steps of intercepting each search query entered using the browser; and modifying the search query that is intercepted to create the modified search query by adding the search term that references the tag word. A related feature is that the step of storing includes the steps of receiving specifications of one or more of the documents that are indexed in the index, in which each of the specifications is associated with the tag word; and storing, in the index, information associating one or more of the documents that are indexed in the index with the tag word, according to the specifications.

Still another aspect of the invention involves a method of constructing an index of a plurality of electronic documents for use in selecting electronic documents from among the plurality of electronic documents, comprising the steps of receiving data that indicates one or more tag words and criteria to be used to determine which of the plurality of documents should be associated with each of the one or more tag words, wherein the tag words are not derived from content of the electronic documents; storing a list of words that are within one document of the plurality of documents; and storing, in the index, information associating each of the one or more tag words with the one document when the one document satisfies the criteria associated with the tag words.

According to yet another aspect, there is a method of constructing an index of a plurality of electronic documents for use in selecting electronic documents from among the plurality of electronic documents, comprising the steps of receiving data that indicates one or more document property values and criteria to be used to determine which of the plurality of documents should be associated with each of the one or more document property values, wherein the document property values are not derived from content of the electronic documents; storing a list of words that are within one document of the plurality of documents; storing, in the index, information associating each of the one or more document property values with the one document when the one document satisfies the criteria associated with the document property values.

Another aspect of the invention is a method of selecting electronic documents from among a plurality of electronic documents, the method comprising the steps of storing a document property value in an index in association with information identifying an electronic document, in which the document property value comprises data that is not derived from content of the electronic document; receiving a search query; modifying the search query to create a modified search query by adding to the search query a search term that references the document property value; and creating a set of search results by searching the index based on the modified search query.

The invention also encompasses a computer system, a computer-readable medium, and a computer data signal embodied in a carrier wave that are configured to carry out the foregoing steps.

The foregoing summary is not intended to describe or summarize all features or aspects of the invention, which are set forth fully in the following description and claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
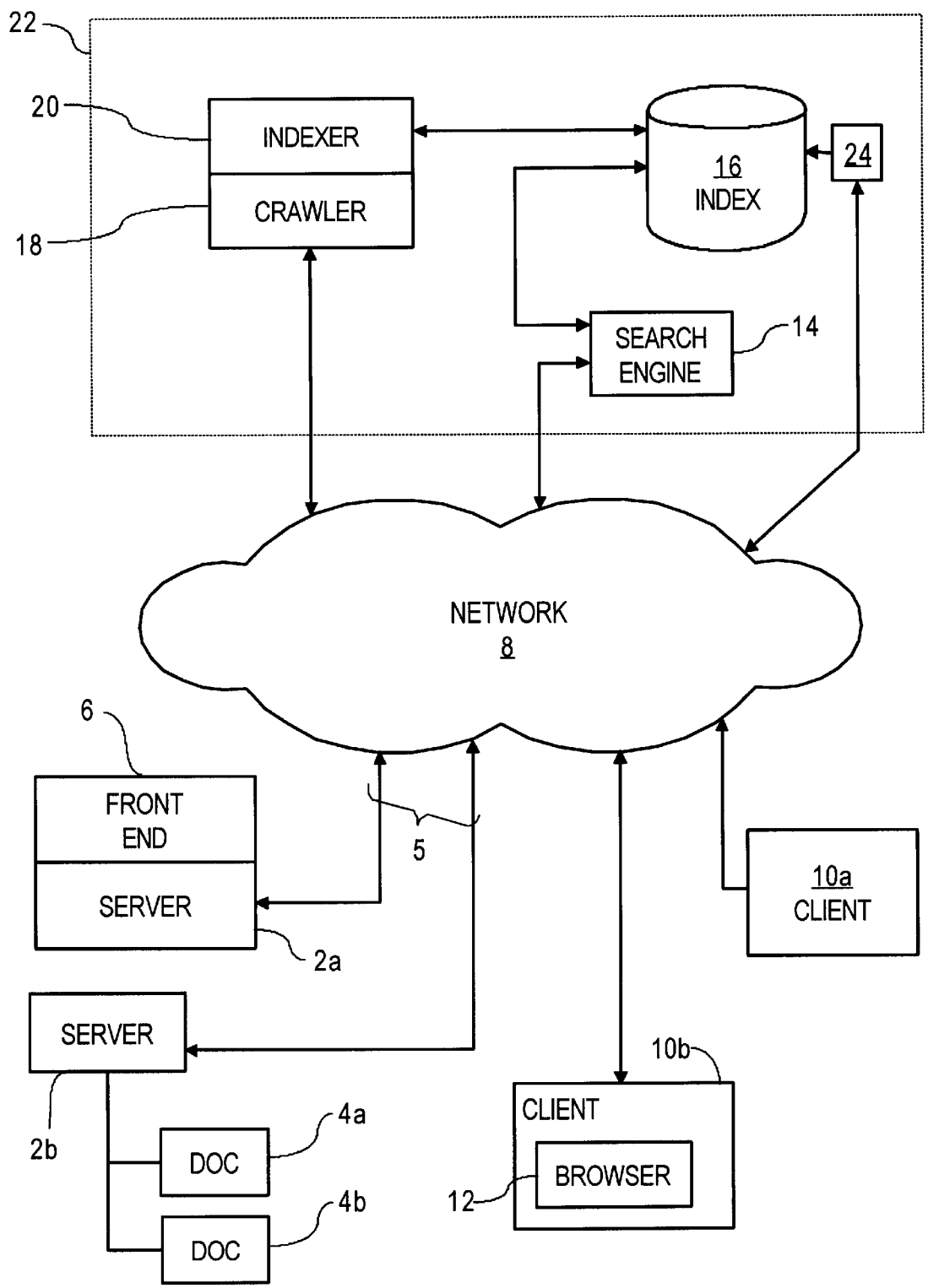
FIG. 1 is a block diagram of a document search system in which one embodiment of the invention may be used.

A method and apparatus, for selecting electronic documents from among a plurality of electronic documents, is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

I. FUNCTIONAL OVERVIEW

Techniques are disclosed for storing, in an index that has been constructed from the content of a plurality documents of a hypertext system, information not found in the documents. These techniques provide a way to associate meta-information, editorial information, commentary, or other tags with documents. Accordingly, the index—and, indirectly, the documents of the hypertext system—can be searched based upon non-content information.

In general, in one embodiment, the foregoing techniques are carried out in the context of an index that has been constructed for a plurality of documents. The index includes an ordered list of words, where each word in the list has been recognized in at least one of the documents. Each word in the list is associated with one or more references to documents that contain that word. The index further includes a list of document location identifiers for all the documents that are referenced in the index. One of the techniques involves receiving a list of document specifications, which may be expressed in literal or wildcard format. A "document specification" is data that indicates criteria for associating documents with a tag word, where the criteria is something other than the documents actually containing the tag word. Each document specification is associated with one or more tag words. Each document location identifier is retrieved from the list and matched against the list of document specifications. If there is a match between the document specification and a document location identifier, then the tag word associated with the document specification is added to the index, and the document associated with the document location identifier that matches the document specification is indexed against that tag word.

As a result, an existing document index is supplemented with tag words, and documents matching one or more of the document specifications are indexed against the tag words in the same way that they would be indexed if they had actually contained the tag words. Accordingly, the index can be searched based upon the tag words, thereby allowing documents in the system to be searched based upon information that is not actually in the documents.

II. OPERATIONAL CONTEXT
A. SEARCH SYSTEM

Embodiments of the invention may be implemented in a variety of contexts. A specifically preferred operational context is a search system for the World Wide Web, including a Web crawler or "spider" system, an index of Web documents, and a search engine that can receive a search query and find matching information in the index. The invention and embodiments thereof are not limited to this context, which is illustrated only as an example of how an embodiment can be used.

FIG. 1 is a block diagram of an exemplary operating context for an embodiment that involves an index of a search engine, or similar facility, for set of hypertext documents or for a hypertext database. One or more servers 2a, 2b are coupled by network connections 5 to a network 8. The servers 2a, 2b may be associated with, or store, one or more documents 4a, 4b, as shown in the case of server 2b. Alternatively, a server 2a may have a front end component 6, such as a data presentation layer, that can receive information about documents 4a, 4b and specially format the information for presentation to a client.

In the preferred embodiment, servers 2a, 2b are Hypertext Transfer Protocol (HTTP) servers, the network connections 5 are TCP/IP connections or other connections that support HTTP transfers, and the network 8 is the global, packet-switched network known as the Internet.

By way of example, two documents 4a, 4b are shown. In a practical system, however, there may be millions of documents accessible through thousands of servers. The location of each document is uniquely identified by a location identifier. An example of a location identifier is a Uniform Resource Locator (URL).

One or more clients 10a, 10b are coupled by network connections to the network 8. The clients 10a, 10b are personal computers, workstations, or servers that can request documents 4a, 4b from the network 8 and present the documents, or information relating to the documents, to a user. In a preferred embodiment, a client 10b executes a browser program 12, such as a World Wide Web browser. The client 10b connects to network 8 using a TCP/IP connection, and connects to one of the servers 2a, 2b using the HTTP protocol. There may be millions of clients 10a, 10b in a practical embodiment of the system.

In one mode of operation, a client 10b submits one or more requests to server 2b to retrieve a particular document from among documents 4a, 4b. The server 2b locates the requested document and returns a copy of it to the client 10b through the network 8. A request and response in the HTTP protocol can be used to carry out this mode of operation.

Preferably, a search engine 14 is coupled to the network 8 and to an index 16. The search engine 14 is a specialized set of one or more software components. The particular internal construction of the search engine 14 is not important, and the structure of a search engine is known in this field. What is important is that the search engine 14 can receive a search request from one of the clients 10a, 10b or one of the servers 2a, 2b, search the index 16 to identify one or more records that are within the scope of the search request, and return information from the records ("search results") to the requesting client through network 8.

A crawler 18 is coupled to the network 8 and to an indexer 20. The crawler 18 and indexer 20 cooperate to periodically visit documents 4a, 4b, and all other documents that are accessible through the network 8, and construct the index 16 based on the contents of the documents. The crawler 18 and indexer 20 may comprise software components that carry out the foregoing functions, and may be integrated as one component.

Crawler 18 and indexer 20 may construct and operate on one or more interim indexes that are created offline and made "live" later. An interim index is constructed during an offline crawling and indexing phase, and when the interim index is complete, it is merged into the index 16. In this way, the crawler 18 and indexer 20 can construct an index without interfering in the operation of search engine 14, which uses the "live" index 16. Use of interim indexes is also favored because the indexing process has been found to be memory-intensive. The indexer 20 can build a temporary index in volatile memory, and then store the index information in an interim index in non-volatile memory when the indexer runs out of volatile memory.

B. CRAWLING AND INDEXING DOCUMENTS

Index 16 may comprise one or more tables, files, or sub-indexes. For example, index 16 may comprise a word index and a document index. The word index is an alphabetic list of all words encountered by crawler 18 and indexer 20 in all documents 4a, 4b. Each word in the word index is associated with one or more document identifiers that identify documents that contain the word. The document index maps the document identifiers to specific document location identifiers, or to URLs, or to other information that may be displayed after a search, such as document title or document abstract.

Operation of crawler 18 and indexer 20 may involve receiving and reading one or more document identifiers, each of which identifies a hypertext document. For example, crawler 18 receives URLs, each of which identifies a Web document among documents 4a, 4b. Crawler 18 may call a process, procedure, program or subroutine and provide it with a list of URLs that the crawler has not yet visited. Crawler 18 may also retrieve a document identified by each URL using an HTTP request.

Each document in the list of URLs is scanned and its content is examined. Each hyperlink within the document is identified. In one embodiment, the documents are formatted using Hypertext Markup Language (HTML), and crawler 18 detects each HTML anchor and associated hypertext reference in the document. The hyperlinks are added to a crawling queue. The crawling queue is a list of document identifiers or URLs that need to be visited by the process. When the process completes processing of the location identifiers that were previously obtained, the process retrieves the next location identifier in the crawling queue. In this way, the process eventually visits all documents to which a particular document points.

For each document that is visited, the system generates a unique document identifier and stores the document identifier in a list of visited documents. In one embodiment, the list is implemented in the form of a vector of visited URLs, in which there is one entry for each visited URL. The process may later search the bit vector to determine whether the system has previously visited a particular URL.

The content of each document is fed to indexer 20, which carries out two main functions.

First, the indexer 20 constructs an index record of the current document and stores the index record in the document index of index 16. Each index record contains, among other things, a hash value that uniquely represents the text contents of the associated document. Each index record also contains the location identifier of the current document, and may also contain values of properties that may be displayed in a search result page, such as document title, document summary, or others. The location identifier may also be stored in hashed form.

Second, the indexer 20 reads each word in the document and indexes the document under that word in the word index of index 16. This function may involve reading a word from a document, checking whether the word is in the word index, adding the word to the word index if it is not found, and associating a reference to the document with the word in the word index. For example, after this process is completed for a set of documents that contain the word "apple", a record of the word index may comprise, in simplified form, the values "apple," "26," "9," "107," "272." This record indicates that the word "apple" appears in documents "26," "9," "107," and "272." The numeric values serve as references to the documents or to the true locations of the documents in the network.

For efficiency and speed, the indexer 16 may store words in the word index in hashed form. For each word in the document, the indexer 16 applies a hash function to the word. In the preferred embodiment, the MD5 hash function is applied, which a fixed-length, 16-byte hash value. The MD5 hash function is described in detail in B. Schneier, "Applied Cryptography" (John Wiley & Sons, 2d ed. 1996), at pp. 436. Use of the MD5 hash function is not required. It is desirable to use a hash function that generates a fixed-length hash value as output, has a uniform distribution of values, and has a low collision rate, such that the hash value uniquely identifies each word that is hashed.

As a result, a rapidly searchable index of all words in all the crawled documents is created. The index is then published to one or more search nodes. Publication may involve sending one or more publication messages to one or more search processes. The publication messages inform the search processes that the sorted index is available for use in searching. The search processes may implement, for example, a Web document search service. An example of a search service that may use the foregoing processes is the HOTBOT® search service commercially available at the URL http://www.hotbot.com/.

C. SEARCHING THE INDEX

To search the index 16, browser 12 submits a search query to search engine 14. The search query contains one or more words, for example, "INKTOMI CORPORATION". The search engine 14 matches words in the query to words in the word list of index 16. The index returns, as search results, information about the documents that are identified by document identifiers associated with matching words in the word list. The returned information may include the title of a document, an abstract, the location identifier or URL of the document. The search results are returned to browser 12 for presentation to a user.

Alternatively, the client 10a connects to the server 2a. The browser 12 submits a search query to server 2a. Server 2a forwards the search query to search engine 14 that produces search results as described above. The search results are returned to a server 2a. Front end 6 of server 2a formats the search results and delivers a formatted page that contains the search results to browser 12.

III. ASSOCIATING DOCUMENTS WITH NON-CONTENT INFORMATION

A. SUPPLEMENTING THE INDEX

Figure 2A:
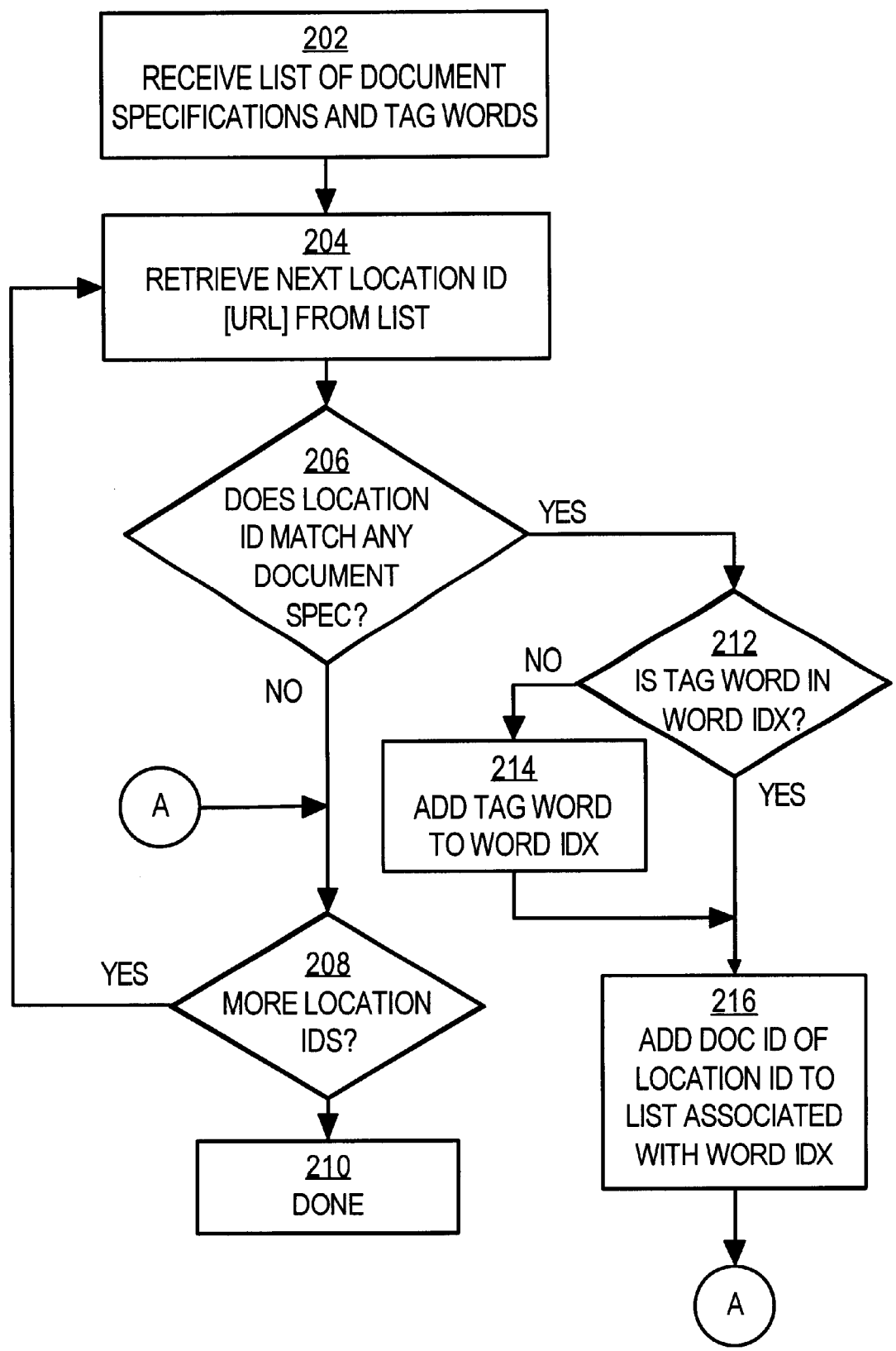
FIG. 2A is a flowchart of a process of associating non-content information with an index of documents.

FIG. 2A is a flow diagram of a process of associating non-content information with documents and the index 16. In this context, "non-content information" refers to any information that does not form part of the literal content of a document, that is, information other than the words or other material of a document that are indexed by the indexer 16 in the manner described above. The non-content information is represented by one or more tag words that are added to the index 16 and associated with one or more documents.

The process of FIG. 2 is undertaken after index 16 is constructed. In particular, the process of FIG. 2 presumes that another process has constructed a word index of the documents that are accessible in a system, and has constructed a list or table of location identifiers or URLs of documents that are accessible to the system.

As shown by block 202, the process receives a list of records, which may be presented to the process in the form of a data file. Each record comprises a document specification and one or more associated tag words.

Figure 3:
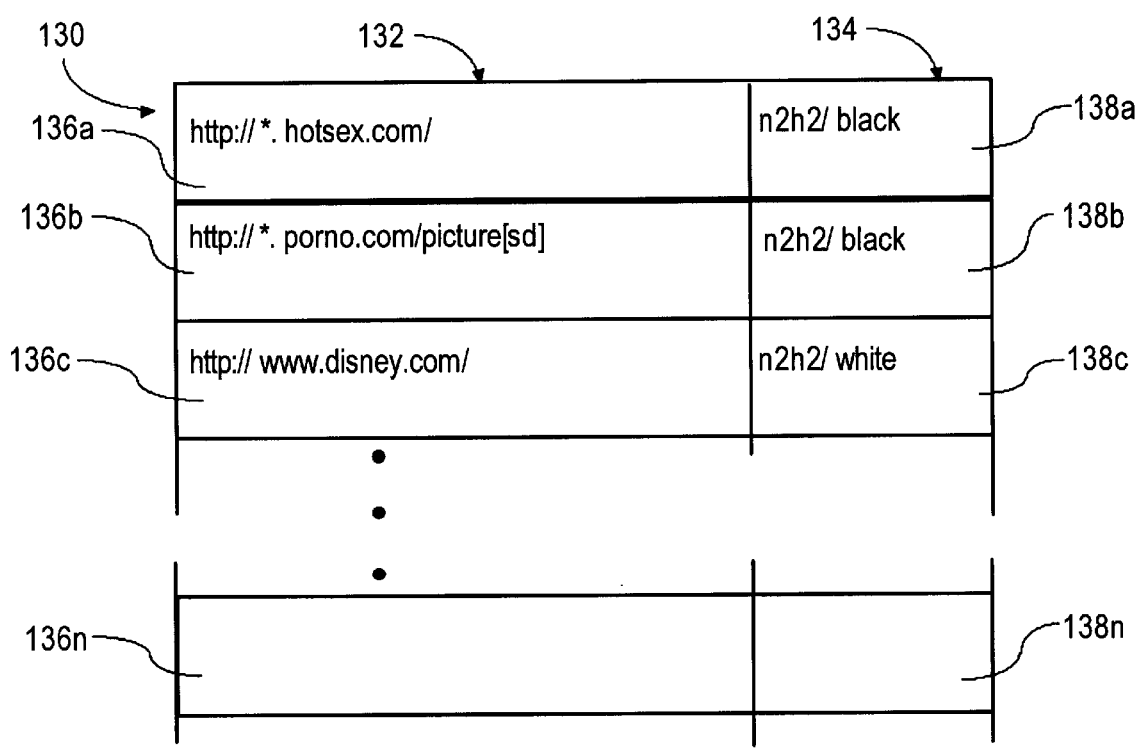
FIG. 3 is a diagram of an exemplary list of document specifications that is received as input by the process of FIG. 2.

FIG. 3 is a block diagram of an exemplary list 130 that comprises document specifications 132 and tag words 134. List 130 may contain any number of pairs of document specifications and tag words.

A tag word is any character string that is to be associated with a document for search purposes. Often, the tag words are dedicated code words, or words that are not normally found in a document or dictionary, although this characteristic is not required. Examples of tag words include "n2h2/black" and "n2h2/white", as shown by tag words 138a, 138c of FIG. 3. Other tag words may be properties or meta-information such as the title of a document, abstract, or others, as described further below. For example, a tag word may be "ADVERTISEMENT" to indicate that its associated Web page(s) contain advertising. A tag word may be "VERIFIED" to indicate that its associated Web page(s) contain factual information that has been verified by some independent third party.

Each of the document specifications 132 specifies a matching criteria. The documents that satisfy the matching criteria are specified in a document specification associated, in the index, with the tag word 134 of the record having that document specification. A document specification 132 may, for example, an expression that identifies the location of a document in a network, such as a URL.

In a preferred embodiment, the document specification may be expressed in a wildcard format. Using a wildcard format for the document specification allows a particular tag word to be associated with more than one URL, without requiring each URL to be identified literally. Document specifications 136a–136c of FIG. 3 are expressed in wildcard format. For example, document specification 136a is httip://*.hotsex.com/. The "*" character in document specification 136a indicates that the document specification includes any server within the domain "hotsex.com". When the process of FIG. 2 processes document specification 136a, the code word 138a will be associated in the index 16 with any indexed document having a location identifier that matches document specification 136a, as explained further below.

No particular wildcard format or syntax is required. In practice, however, having a formal wildcard specification or a set of wildcard format rules is advantageous. A preferred wildcard format or syntax is described further below.

The process retrieves the next location identifier or URL in the table of location identifiers of index 16, as shown by block 204. The loop formed by block 204 and block 208 represents a sequential retrieval of the location identifier or URL of each document that is indexed in index 16.

The process then tests whether the current location identifier matches any of the document specifications in the list that was received in block 202, as shown by block 206. For example, block 206 may involve matching a URL indexed in index 16 to the document specification 136a of list 130. If there is no match, then control is passed to block 208 to obtain the next location identifier, if any. When document specifications are in wildcard form, block 206 may involve parsing the document specification according to one or more wildcard format rules or syntax rules.

If there is a match, then the process has identified a document indexed in index 16 that is within the scope of a document specification of the list obtained in block 202. In response, the process retrieves the tag word that is associated with the matching document specification in the list. For example, if the current URL of the index 16 matches document specification 136a, then the process retrieves tag word 138a from list 130. The process then determines whether that tag word is currently in the word index of index 16, as shown by block 212. If the tag word is not in the word index, then control is passed to block 214, in which the tag word is inserted into the word index by adding a new record to the word index.

Thereafter, or if the tag word is already in the word index, control is passed to block 216. The process obtains a document identifier that is associated with the current location identifier. The document identifier is stored in the word index in association with the tag word.

For example, in the context of an index of Web documents, block 206 involves matching a URL indexed in the system to one of the document specifications 132 of list 130, such as document specification 136a. If a match occurs, the process retrieves a document identifier that is associated with the matching URL. The process finds the value of tag word 138a in the word index of index 16. The document identifier is stored in the word index in association with that word value.

As a result, a particular document identified by a particular URL is now indexed in the system in association with a tag word. The process is carried out or iterated for each URL that is indexed in the system and for each of the document specifications 132 in list 130.

Figure 2B:
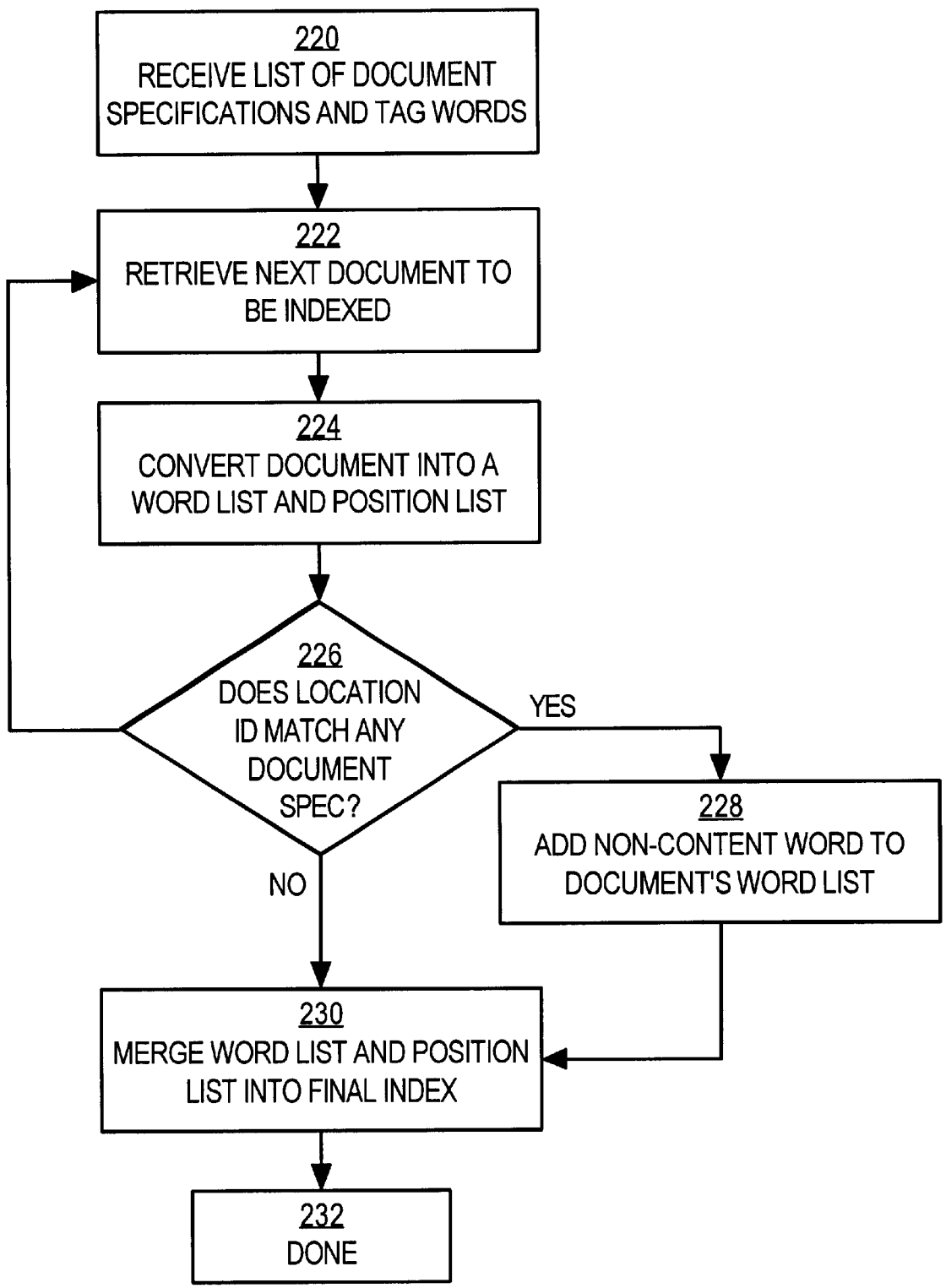
FIG. 2B is a flowchart of an alternate process of associating non-content information with an index of documents as the index is constructed

The foregoing describes a process of taking an index after it has been constructed and marking it up with non-content information. Generally, indexing involves taking a document, converting it into a list of words and their positions, and merging these lists into a final index. FIG. 2B is a flow diagram of an alternate embodiment whereby the non-content information is added to the index at the time the document is being indexed.

As shown in FIG. 2B, block 220, a list of document specifications and tag words is received. Block 220 may involve the same steps set forth above in connection with block 202 of FIG. 2A. In block 222, the next document to be indexed is retrieved. The steps of block 220 may occur in the normal indexing process in which documents are sequentially retrieved and indexed. Similarly, as part of the normal indexing process, the document is converted into a word list and a list of the positions of the words, as shown in block 224.

In block 226, the document's location identifier is compared to the document specifications that were received in block 220. If a match occurs, then in block 228 the non-content tag words received in block 220 are added to the document's word list. In block 230, the word list and position lists are merged into the final index. At block 232, completion of the process yields the complete index.

Thus, in the embodiment of FIG. 2B, the indexing process is enhanced by doing the tag specification lookup at the time the document is converted into a word list. If any non-content tag words are found, then they are added to the word list before the list is merged into the index.

B. WILDCARD FORMAT FOR DOCUMENT SPECIFICATIONS

Preferably, a document specification in wildcard format may be expressed according to one or more of the following wildcard format rules.

A wildcard may appear in the IP address portion of a document specification. Table 1 compares examples of document specifications having a wildcard designation in the IP portion to the scope or meaning, as interpreted by the process of FIG. 2, of such specifications.

TABLE 1

WILDCARD IN IP ADDRESS

| DOC SPECIFICATION | SCOPE |
| --- | --- |
| http://206.19.112.14:8000 | URLs matching this host (port 8000) |
| http://206.19.112.14 | URLs matching this host on default port 80 |

TABLE 1-continued

WILDCARD IN IP ADDRESS

| DOC SPECIFICATION | SCOPE |
|---|---|
| http://206.19.112.14:[0–9]* | URLs matching this host on any port |
| http://206.19.112.* | URLs on this subnet (port 80) |
| http://206.19.* | URLs on this subnet (port 80) |
| http://206.* | URLs on this subnet (port 80) |

A wildcard may appear in a hostname. Table 2 compares examples of document specifications having a wildcard designation in the hostname to the meaning, as interpreted by the system, of such specifications.

TABLE 2

WILDCARD IN HOSTNAME

| http://www.naughty.psiweb.com:8000 | URLs matching this host (port 8000) |
|---|---|
| http://www.naughty.psiweb.com:[0–9]* | URLs matching this host (any port) |
| http://www.naughty.psiweb.com | URLs matching this host (port 80) |
| http://*.naughty.psiweb.com | URLs matching this subnet (port 80) |
| http://*.psiweb.com | URLs matching this subnet (port 80) |

A wildcard may appear in a path component. If no path component is specified, then any URL that matches the host specification will be tagged. That is, the absence of a path component implies the wildcard designation "/*".

The path component of the URL can be specified using "UNIX-style" filename wildcard patterns. Patterns can be formed with the following elements.

The character "?" matches any single character.

The character "*" matches any sequence of zero or more characters.

The designation "[x . . . y]" matches any single character specified by the set (x . . . y), where any character other than minus sign or close bracket may appear in the set. A minus sign may be used to indicate a range of characters. That is, "[0–5abc]" is a shorthand designation for "[012345abc]". More than one range may appear inside a character set; [0–9a-zA-Z.] matches almost all of the legal characters for a host name.

The designation "[^ x . . . y]" matches any character not in the set x . . . y, which is interpreted as described above for the designation "[x . . . y]".

Some examples of document specifications that have wildcard elements in a path component include:

http://www.childsafe.com/IC* http://www.netguide.com/part?.html http://www.nps.gov/fo[a–z]*/*

In the preferred embodiment, except for the special wildcarding characters described above, the rest of the document specification conforms to the URI syntax in the HTTP .1.1 specification, also called Request For Comment (RFC) 2068, which is published at http://www.w3.org/Protocols/rfc2068/rfc2068.

C. TAGGING WITH DOCUMENT PROPERTIES

As noted above, in an alternate embodiment, an indexing system may also be supplemented with non-content document properties. Such supplementation may be done alone or in combination with supplementation by non-content document words.

In this embodiment, the index contains metawords and document properties. "Metawords" are words that documents get indexed against. Documents that contain metawords can be located in the index by combining one or more metawords in a Boolean query and submitting it to the search engine. "Properties", however, cannot be used to locate documents. Properties represent information stored in the index for each document, which can be returned to the client for display on the results page, after the query has been evaluated. Properties include document Title, Abstract, and URL, and or other information that describes a document or its characteristics.

Storage of non-content document properties is useful, for example, to enable a document search system to report descriptive information about documents in association with the results of a search. For example, assume that Company M has a team of people dedicated to evaluating Web pages and writing up small editorial comments on each page. An editorial might say, "This page is full of excellent information and gets a Company M rating of 10." or alternately, "This page gives an adequate description of Sailing in the San Francisco Bay and gets a Company M rating of 6". Company M may want to display this editorial information in its results pages. Company M can achieve this by using the above-described tagging mechanism to associate the non-content editorial information as a document property. The document property information would be stored in the structure illustrated in FIG. 4B.

D. PREFERRED INDEX STRUCTURE

FIG. 4A, FIG. 4B, FIG. 4C, and FIG. 4D are diagrams that show a preferred structure of portions of index 16, which facilitates association of non-content information with an index of stored documents, and retrieval of documents based on non-content information. Each of the structures described below may be stored in volatile memory and periodically stored in non-volatile storage such as disk storage. Each structure may be organized as a table, file, variable, object, or other data structure defined by an abstract data type in a source program. The index 16 may also include other data structures and program elements that support word indexing, database lookups, and related functions. The particular structure of these elements is not critical. What is important is that the system provides a fast, efficient way to index hypertext documents according to non-content information, and a fast, efficient way to search the index according to a search query and return a set of search results.

Figure 4A:
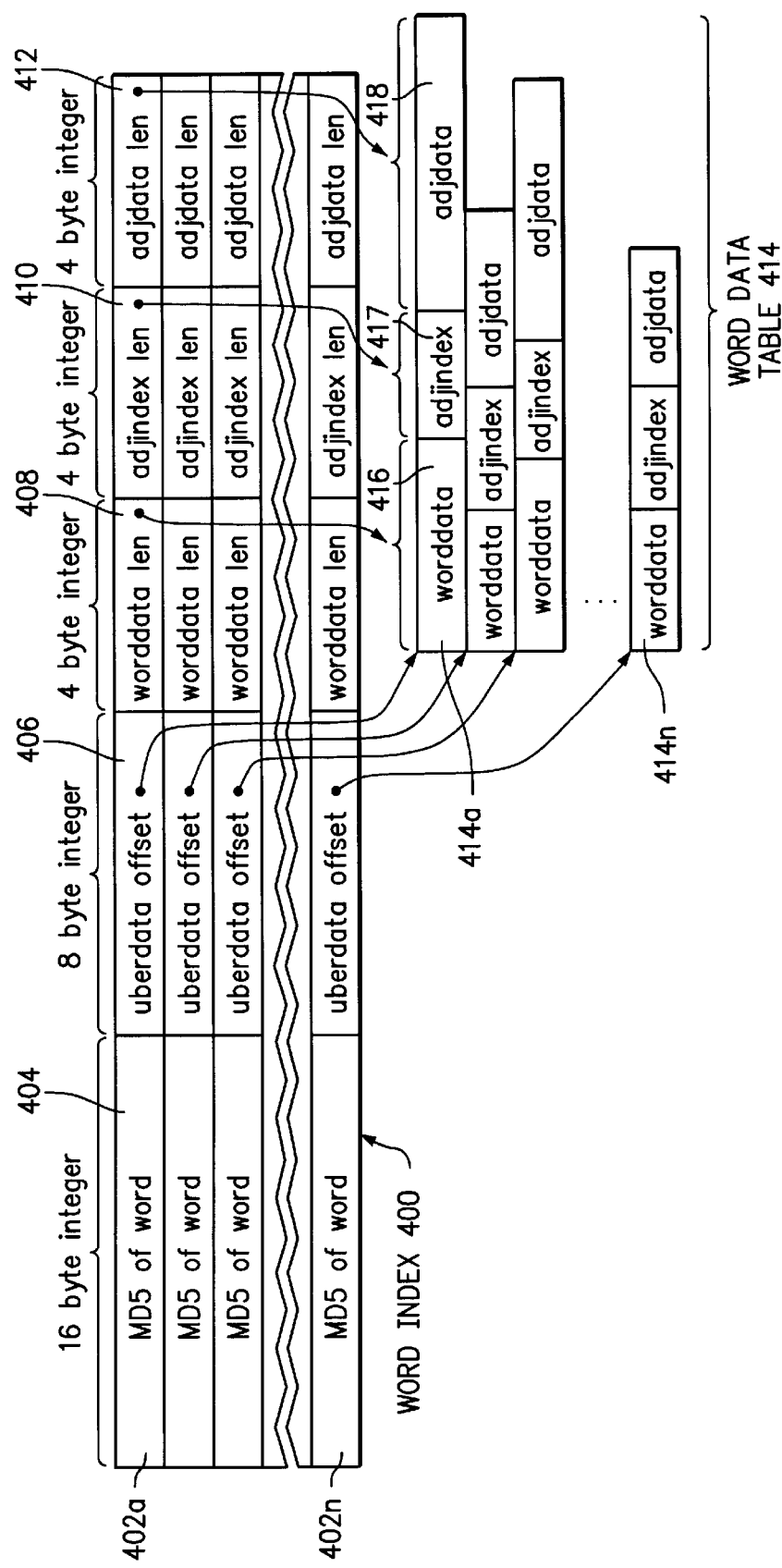
FIG. 4A is a diagram of a word index structure that is used in an index organized according to a preferred embodiment of the invention.

FIG. 4A is a diagram of a preferred embodiment of a word index 400 that comprises one or more records 402a–402n. Each record comprises a word hash value 404, an offset value 406, a word data length value 408, an adjacency index length value 410, and an adjacency data length value 412. The word hash value 404 is generated by applying a hash function, such as the MD5 function, to a word found in a document. Collectively, the offset value 406, word data length value 408, adjacency index length value 410, and adjacency data length value 412 provide an indirect reference or mapping to records, in a document index, for documents in which the word identified by word hash value 404 appears.

In a preferred embodiment, the offset value 406, word data length value 408, adjacency index length value 410, and adjacency data length value 412 reference a word data table 414. The word data table 414 comprises a plurality of word data records 414a–414n. Each of the word data records 414a–414n comprises a word data field 416, an adjacency index field 417, and an adjacency data field 418. Each offset value 406 of a word index record 402a–402n points to the beginning of a record in the word data table 414. The word data length value 408, adjacency index length value 410, and adjacency data length value 412 respectively stored the lengths in bytes of the word data field 416, adjacency index field 417, and adjacency data field 418 of the record 414a–414n to which the offset value 406 points. These values enable the index 16 to rapidly and efficiently retrieve data from the word data table 414 once a particular word of interest has been identified in the word index 400. Broadly speaking, the values enable the index 16 to know, in advance of reading the word data table 414, exactly where to retrieve needed information.

Each word data field 416 stores a "document vector," which is a list of document identifiers in which the associated word appears. Preferably, the document vector is delta-compressed. Collectively, an adjacency index value 417 and an adjacency data value 418 represent a word "position vector" or set of adjacency information. Each adjacency index value 417 stores a set of length values, in which there is one length value for each document in the document vector. Each adjacency data value 418 stores a set of variable-length position vectors. The adjacency information defines what words are located adjacent to a particular word, and is used when searching for word combinations. For example, if a user enters the search query "cat in the hat", the system uses the adjacency information to determine which index entries represent words that are adjacent to another word in the search query. In one embodiment, the adjacency information stores values indicating positions of the word within the document, which values can be used when searching for adjacent word combinations.

Figure 4B:
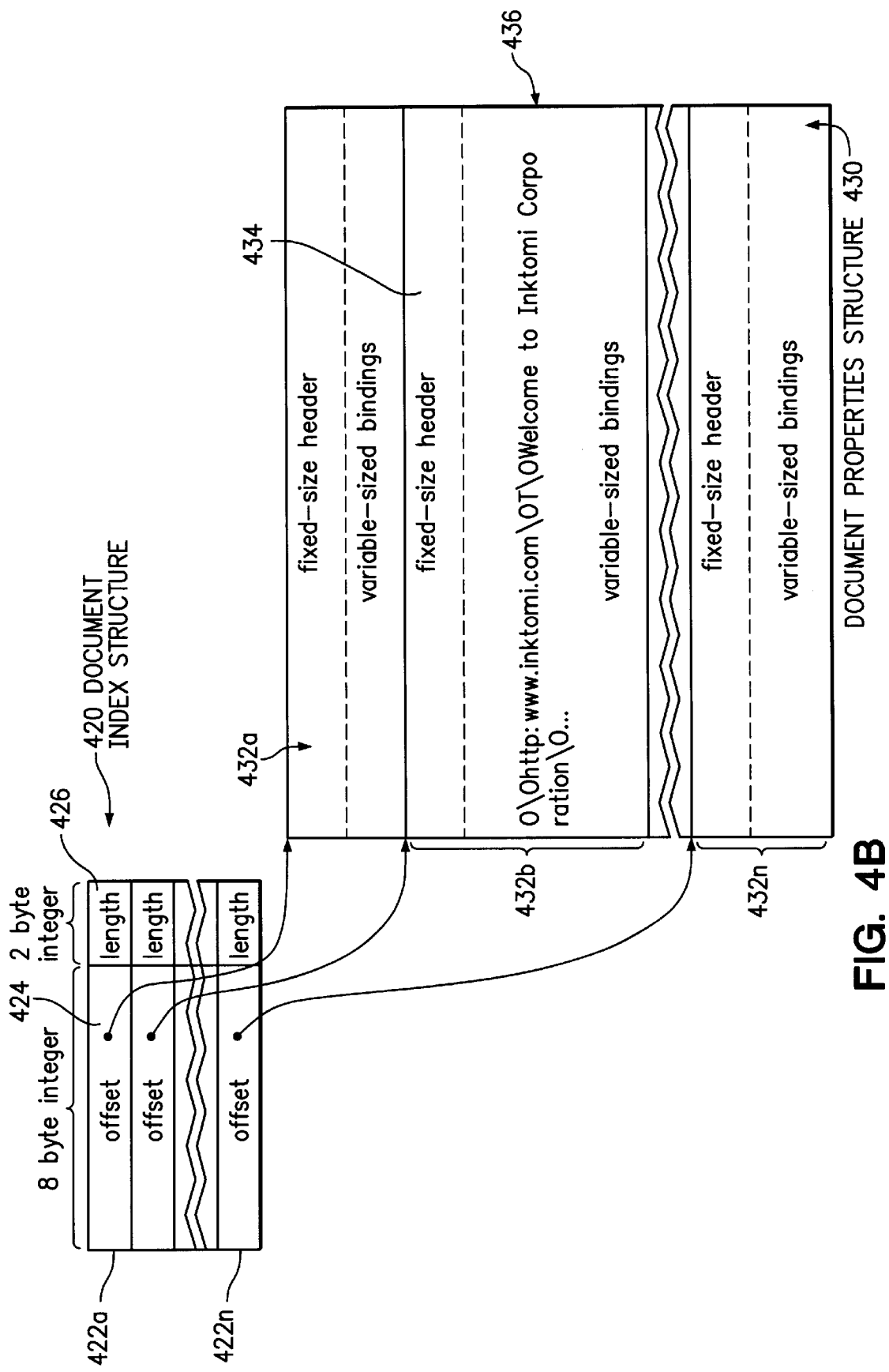
FIG. 4B is a diagram of document index structure and a document properties structure that are used in an index organized according to a preferred embodiment of the invention.
Figure 4C:
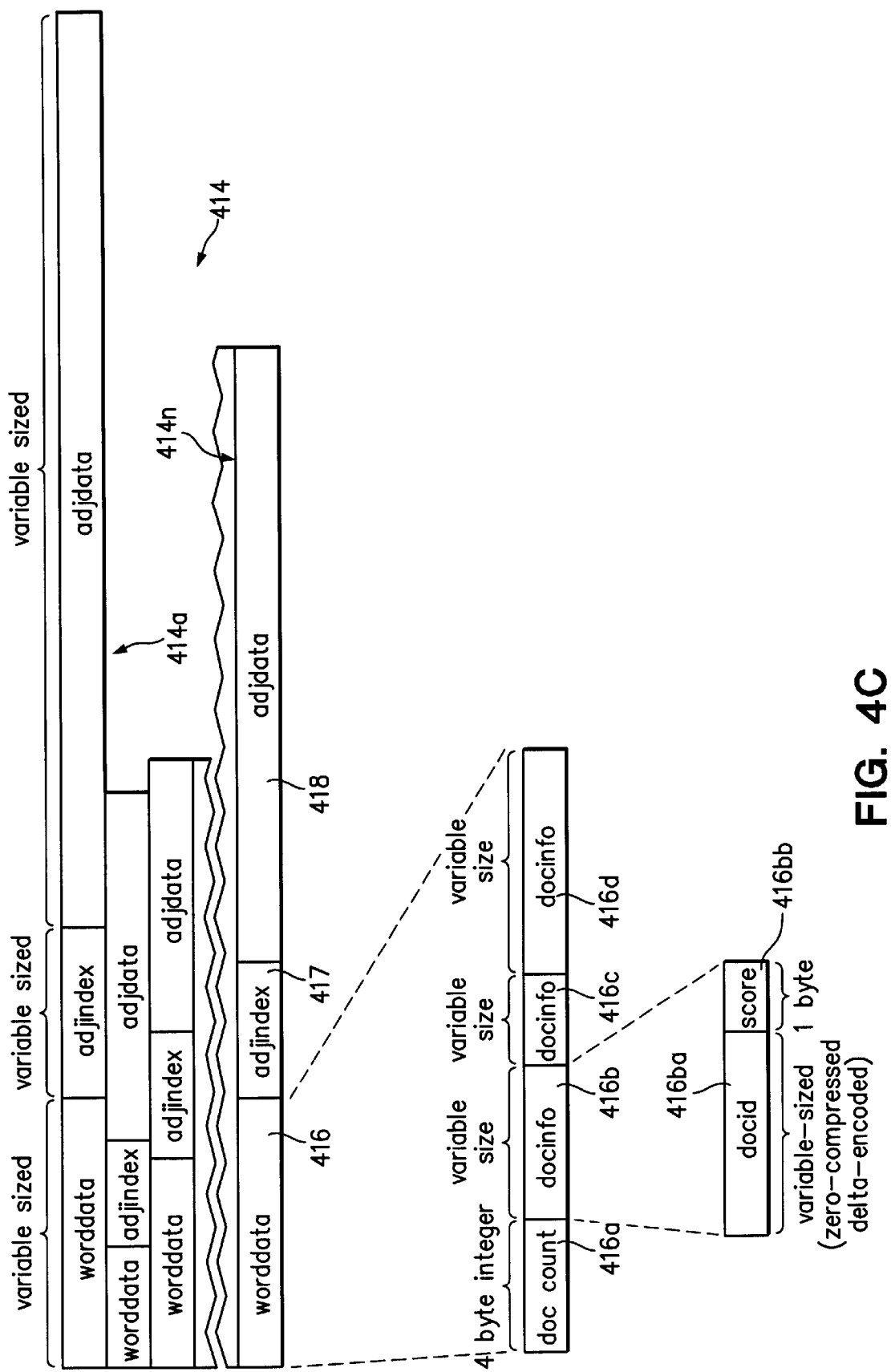
FIG. 4C is a diagram of a global data structure and a word data structure that are used in an index organized according to a preferred embodiment of the invention.

FIG. 4C is a diagram of certain internal details of a preferred embodiment of the word data table 414. Each word data value 416 preferably stores a document count value 416a, and one or more document info values 416b, 416c, 416d. The document count value identifies the number of document info values 416b, 416c, 416d that follow. Each document info value summarizes information about the word in a document, and comprises a document identifier 416ba and a score value 416bb. The document identifier value 416ba uniquely identifies a document in the index 16. For example, a document identifier value 416ba of "44" represents the 44$^{th}$ document in the index.

The score value 416bb preferably is a one-byte encoded score. In one embodiment, the score value is used to determine how relevant the word is to the document that it is indexed against. For regular document content words, the score value represents the number of times the word appears in the document, normalized over the document's length. For example, if the word appears twenty (20) times in a relatively short document, the score value will be high, whereas if the word appears once in a long document, the score will be low. For tag words, the score may be a fixed value, such as "100". In an alternate embodiment, a user or customer may specify a score for each tag word.

Preferably, the document identifier values 416ba are compressed by delta encoding and by using a variable-length coding of the non-zero bytes. Delta encoding involves computing the difference between a current document identifier value and the previous document identifier value. The least significant bit of each byte of a document identifier value 416ba is used as a flag that indicates whether another byte follows. The remaining seven (7) bits of each byte together form an integer value, with the least significant bits appearing last. This structure provides a compact and efficient representation of the document identifier values.

Figure 4D:
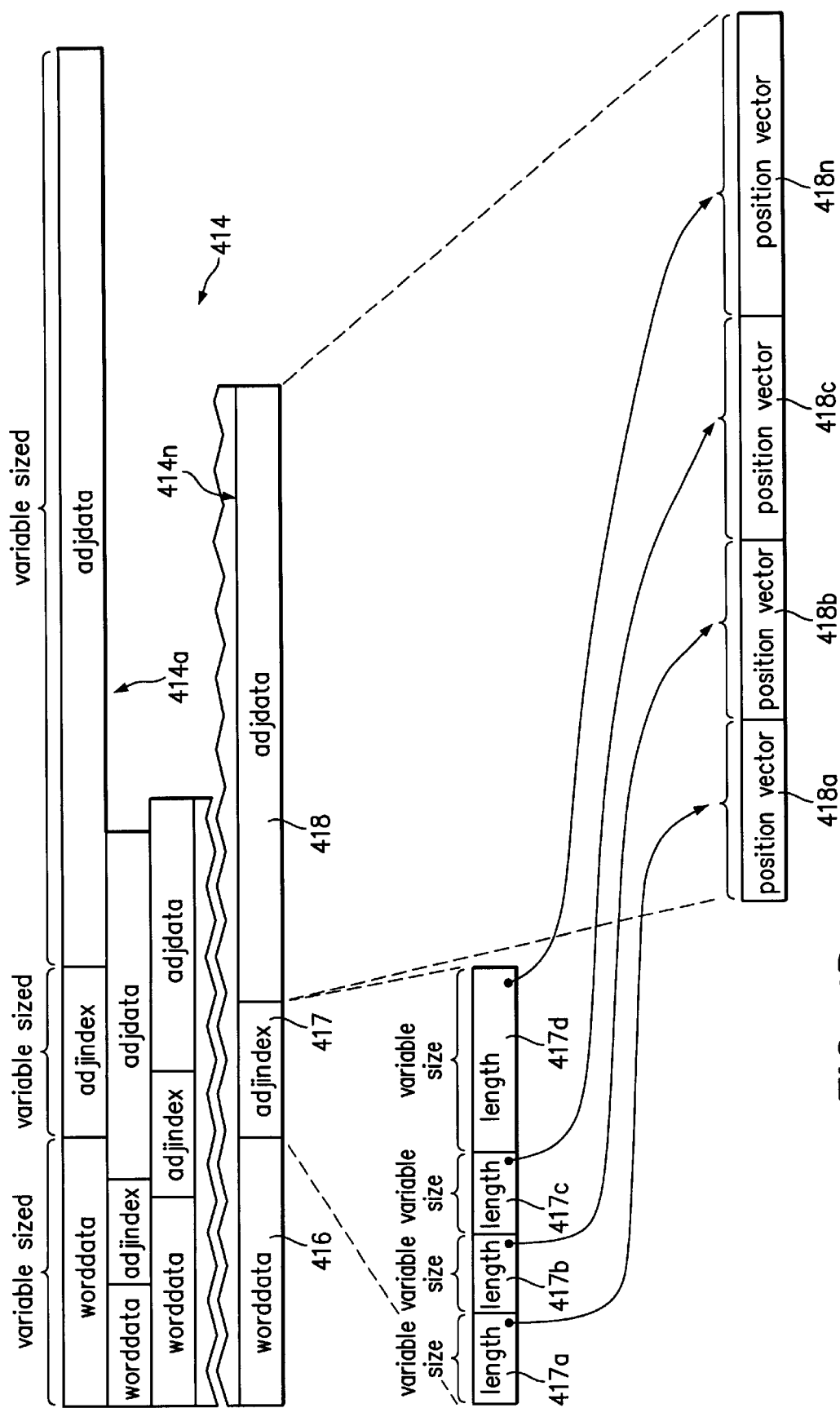
FIG. 4D is a diagram of the global data structure of FIG. 4C, and an adjacency index structure, that are used in an index organized according to a preferred embodiment of the invention.

FIG. 4D is a diagram of the word data table 414 showing details of the adjacency index values 417. Each adjacency index value 417 is organized in parallel to the word data value 416 of the same record 414a–414n, and has the same number of entries. Each entry is a length value 417a–417d and corresponds to a document info value 416b, 416c, 416d of a word data value 416 in the same record 414a–414n. Each length value 417a–417d represents the length in bytes of a position vector in the adjacency data value 418 of that record. Preferably, each length value 417a–417d is delta-encoded and zero-compressed.

This storage scheme is used to improve system performance. Better performance for each query is achieved, in part, by reducing the amount of disk I/O. The vast majority of queries do not require use of adjacency information; only phrase searches, such as "United States", require the adjacency information. By separating the word data from the adjacency data, the system minimizes the amount of data that is read from disk for the typical query. The delta-encoded and zero-compressed values help reduce the amount of space they occupy, further reducing I/O.

Each adjacency data value 418 comprises one or more position vector values 418a–418n. Each position vector value 418a–418n stores an offset, in bytes, from the beginning of the document, in which the word that is associated with the current record 414a–414n appears. Preferably, each position vector value is delta-encoded and zero-compressed.

FIG. 4B is a diagram of a document index structure 420 and a document properties structure 430 that are referenced by the document identifier value 416ba. The document index structure 420 provides an indirect mapping of the document identifier value 416ba into the document properties structure 430. The document index structure 420 comprises a plurality of records 422a–422n, in which each record has an offset value 424 and a length value 426. The document identifier value 416ba of the word data value 416 is equivalent to the relative position of records in the document index structure 420. Thus, a document identifier value 416ba having a value of "4" references the fourth record 422a–422n of the document index structure 420.

The document properties structure 430 comprises a plurality of record pairs 432a–432n. Each record pair comprises a fixed-size header 434 and a variable-size bindings section 436. Headers 434 store static document information such as the time the document was crawled or scanned, format, document length, etc. The bindings sections 436 each store document property information in the form of one or more tag/value pairs. Tags and values are null-terminated strings. Tags are one- or two-character mnemonics. Values are text strings that represent a property value. For example, the tag "U" means "URL", and an associated value might be "http:www.inktomi.com".

Each offset value 424 of the document index structure 420 specifies or points to a relative offset of the document properties structure 430. Each length value 426 specifies the length in bytes of the record pair 432a–432n to which an associated offset value 424 points.

Using this structure, a particular document may be rapidly and efficiently located based upon a word that appears in the document. Words are indexed in the word index 400. A particular word of interest is found in the word index 400 using a search based on hash value. Information in a matching record of the word index record 400 points to a record of the word data table 414. A document identifier value 416ba in the record of the word data table points to the document index structure 420. The document index structure 420 points to a record of the document properties structure 430. Values in the document properties structure 430 specifically identify a document that contains the matched word. The values can be provided to a browser, or the referenced document can be retrieved.

Other support structures and files for index 16 may be provided. For example, index 16 may include a word list ("lexdata") file that contains a list of all words in the database. Index 16 may include a database types ("dbtypes") file that contains a list of database identifiers for the index. It may be used by the search engine 14 to allow searches that are restricted to a subset of cluster nodes.

A "cluster" is a group of tightly coupled workstations used to achieve parallelism, fault-tolerance and scalability. Each workstation in the cluster is called a "node". In a preferred embodiment, the word index is distributed across the nodes in a cluster of workstations. Each workstation holds the index information for a subset of the World Wide Web. The aggregate index is called a "database".

Index 16 also may include a deleted document list ("docid" file) that stores a list of deleted documents, represented by a list of document identifiers and, optionally, a location identifier or URL. Index 16 may also have a server info list ("serverInfo" file) that stores a record for each unique server that the indexed documents came from. Each record may store a server type value and server IP address value derived from the "Server" header of an HTTP response that is received in response to a request to retrieve a document from that server. Index 16 may also contain a version file that stores information identifying the current version of the index and its constituent files, to enable proper synchronization.

IV. SEARCHING BASED ON NON-CONTENT INFORMATION

In one mode of use, the techniques disclosed herein can be used in a variety of useful document search applications.

Figure 5:
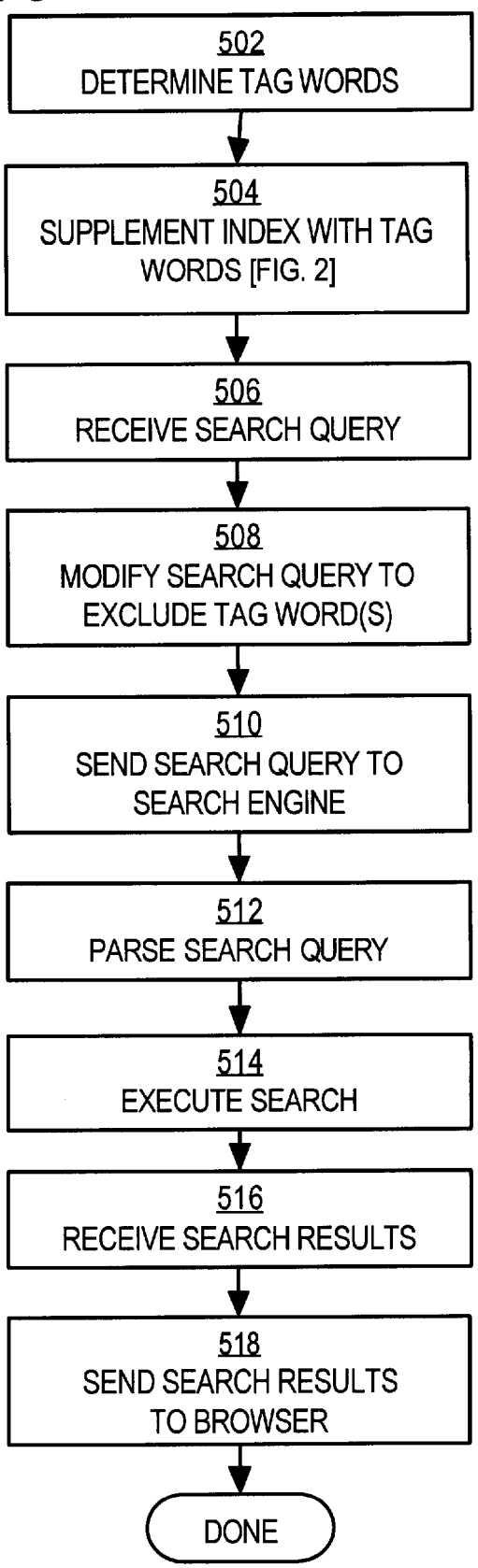
FIG. 5 is a flowchart of a process of carrying out a search query based on non-content information.

FIG. 5 is a flow diagram showing a process of searching an index, which has been tagged in the manner described above, to provide a service that filters Web documents to eliminate documents available over the Web that are considered undesirable for viewing or review by children.

In block 502, tag words to identify desirable or undesirable documents are determined. Block 502 may involve coining or deciding upon appropriate tag words for the service to be provided. There may be one, two, or more tag words. For example, the tag words are "ACME/BAD" and "ACME/GOOD". The tag words indicate, respectively, that Acme Corporation has reviewed a particular page and determined whether it is good or bad for children.

The index 16 is supplemented by associating documents in the index with one or more of the tag words, as indicated in block 504. Assume, for purposes of this example, that all bad documents containing the word SEX have been indexed in the index 16 in association with the tag word "ACME/BAD." This step may be carried out using the process of FIG. 2. For example, Acme provides to index 16 a list of document specifications that identify bad Web documents containing the word SEX and that are to be associated with tag word "ACME/BAD." There may be documents indexed in the index that contain the word SEX but are not deemed bad, and which are not indexed in association with the tag word.

A search query is formulated and received by the process, as shown by block 506. For example, suppose a child at the workstation enters the search query "SEX". Internally, this query is represented in the format "+SEX". The "+" character reflects Boolean AND logic. Thus, the character string "+SEX" means "find documents that contain the word SEX."

In block 508, the search query is modified in a manner that excludes one or more of the tag words from the scope of the search query. For example, the browser 12 intercepts the search query and adds the command "−ACME/BAD" to the query. The "−" character is reflects Boolean NOT logic. Thus, the query will omit any document that is indexed under "ACME/BAD". In one embodiment, Acme provides a browser plug-in program that the user installs in association with the browser 12, and the plug-in program intercepts the search query and modifies it. Alternatively, browser 12 has a built-in process that modifies search queries. According to another alternative, multiple different search engines use the same search directory, but apply different filters to the search query. This allows the search results to be tailored to a particular audience that is served by each search engine. For example, a search engine intended for an audience of professionals in the medical field would apply a filter that includes documents of interest to the medical community in the search results. According to yet another alternative, a user may select the filters that the user wishes to use in the query, and store the filters in a "cookie" file in association with the browser. In this alternative, the search engine is tailored personally to the preferences of an individual user.

Other alternatives—(1) different search engines use the same search directory but apply different filters. This allows audience-tailored search engines log a kid-safe search origin, (2) let the user select the files he wants to and store them in a cookie to personally tailor the search engine.

The browser sends an HTTP request, containing the modified search query, to the search engine 14, as shown by block 510. At block 512, the search engine 14 parses the search request to determine its meaning and how to query the index 16 properly. At block 514, search engine 14 executes a search against the index 16, which has been supplemented with the tag words as described above. In block 516, search engine 14 receives a set of search results from the index 16. Because of the manner in which the search query has been modified, all documents indexed under the tag word "ACME/BAD" are excluded from the search results. In block 518, the search engine 14 delivers the search results to the browser 12.

As a result, browser 12 receives a filtered set of search results in which documents deemed bad for children have been removed. The child does not see Web documents that have been indexed under "ACME/BAD."

In another embodiment, the documents contain actual or allegedly factual information, and the tag words indicate whether an impartial third party has verified the truth the information. The tag words are used to limit a Web search to only those documents that have been verified by the third party.

In still another embodiment, a tag word indicates whether a document contains advertising. The tag word is used to formulate a search query that will filter out advertising from the search results.

Thus, embodiments of the invention are applicable to any context in which a third party labels Web documents with a label that contains meta-information or other descriptive information.

Another advantage is that, since the tags are indexed just as if they were words contained in the document, no special modifications have to be made to the indexing or search logic in order to support non-content based filtering.

Further, embodiments of the invention may be used to implement a service that can filter out, from a set of search results, documents that contain a particular search term but are not about that search term. For example, consider a search query submitted by a dog aficionado that comprises the word "DOGS". The tag word is "AKC/DOGS." The American Kennel Club, which is a respected authority on dogs in the United States, provides a list of specifications which, in their simplest form, may be URLS, that correspond to documents that the AKC has verified to be genuinely about dogs. The search query is automatically converted to a query in the form "AKC/DOGS". Thus, the search query retrieves only documents about dogs that have been reviewed and approved by the American Kennel Club. Moreover, documents that contain the word "DOGS" but that have nothing to do with dogs are filtered out of the search results. Thus, the invention provides an effective weapon against "spamming" of an indexing system.

In another embodiment, a search service comprises one or more search nodes and one or more master nodes. Multiple search nodes are used to distribute search loading and to distribute index loading. Collectively, the search nodes and master node are called "back end" elements. In the preferred embodiment, one or more separate servers are "front end" elements. The front-end elements provide an interface to a browser. For example, the front-end elements may format the search results and may present the search results to the browser in a custom or specialized manner. An example of such presentation is a customized result page prepared using an HTML template.

One of the master nodes accepts an HTTP connection and receives a search request from a browser or from another processor. The master node broadcasts the search request to all nodes of the search system. Each node contains a search engine that can open a socket connection to the index, including the structures described above. Each node executes the search request against the index structures. Each node returns a set of search results to the master node. The master node merges all search results and returns the merged search results to the client. When the master node merges the search results, the master node reads search query and applies it to the search results, thereby adding or eliminating documents that are indexed under a particular tag word that appears in the search request. The merged search results, filtered according to the request and the tag word, are sent to the front-end elements. The front-end elements format the search results and display them at the browser.

V. HARDWARE OVERVIEW

Figure 6:
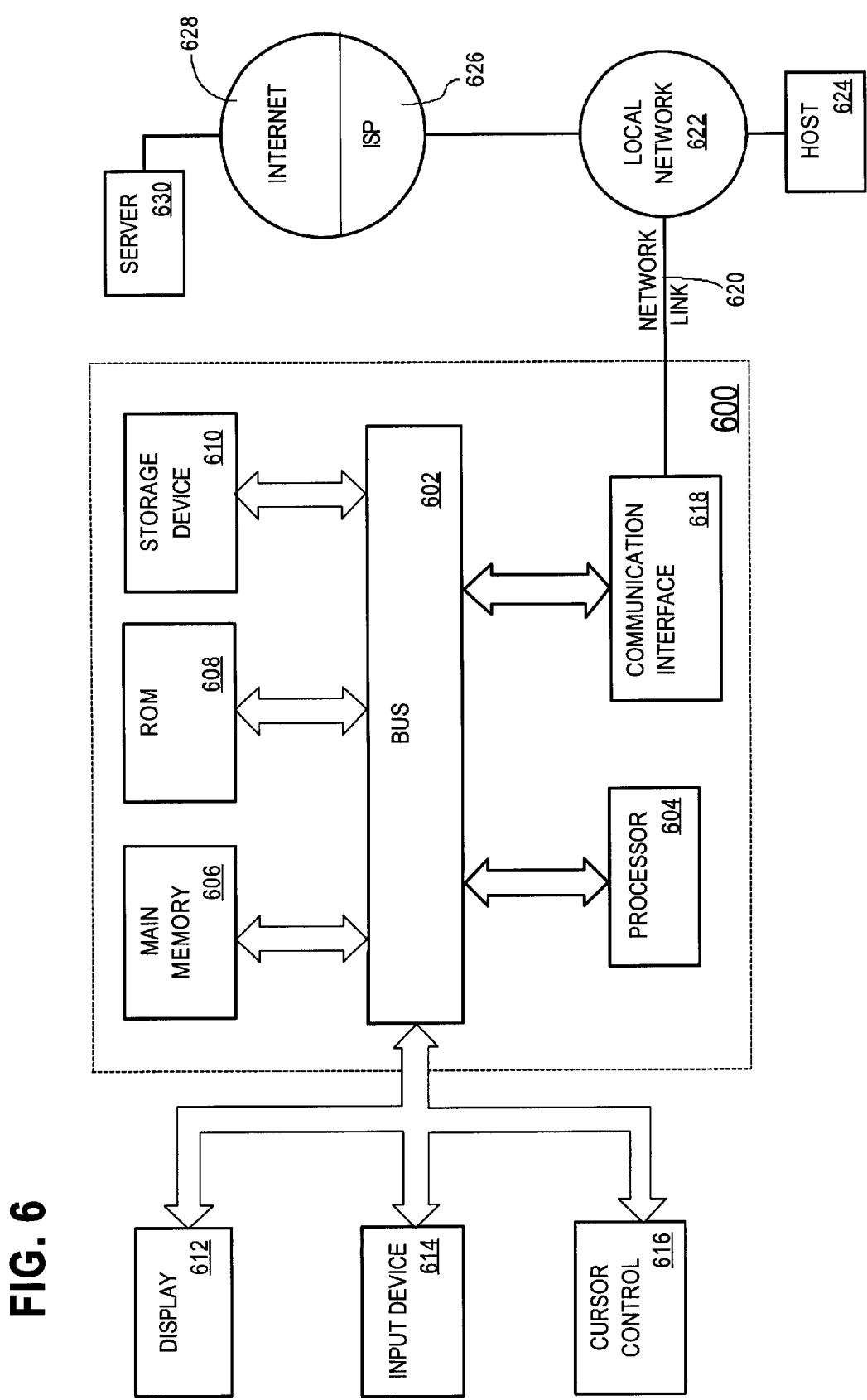
FIG. 6 is a block diagram of a computer system hardware arrangement that may be used to carry out an embodiment.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for selecting electronic documents from among a plurality of such documents. According to one embodiment of the invention, selecting electronic is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for selecting electronic documents as described herein.

Processor 604 may execute the received code as it is received, and/or stored in storage device 610, or other non-volatile storage for later execution. In this manner, computer system 600 may obtain application code in the form of a carrier wave.

EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of selecting electronic documents from among a plurality of electronic documents, the method comprising the steps of:

storing a tag word in an index in association with information identifying an electronic document, in which the tag word comprises data that does not appear in a content of the electronic document;

receiving a search query;

modifying the search query to create a modified search query by adding to the search query a search term that references the tag word; and creating a set of search results by searching the index based on the modified search query;

wherein the step of storing includes the steps of:

receiving data that indicates one or more tag words and criteria to be used to determine which of the plurality of documents should be associated with each of the one or more tag words, and in which at least a portion of the data is expressed in a wildcard format;

retrieving a location identifier of each of the documents that are indexed in the index;

matching each location identifier to each of the criteria; and when one location identifier matches one of the criteria, storing, in the index, information associating such location identifier with one or more of the tag words.

2. A method of selecting electronic documents from among a plurality of electronic documents, the method comprising the steps of:

storing a tag word in an index in association with information identifying an electronic document, in which the tag word comprises data that does not appear in a content of the electronic document;

receiving a search query;

modifying the search query to create a modified search query by adding to the search query a search term that references the tag word; and creating a set of search results by searching the index based on the modified search query;

wherein the step of storing includes the steps of:

receiving specifications of one or more of the documents that are indexed in the index, in which each of the specifications is associated with one or more tag words, and in which one of the specifications is expressed in a wildcard format;

retrieving a location identifier of each of the documents that are indexed in the index;

matching each location identifier to each of the specifications by interpreting the one of the specifications that is in the wildcard format according to one or more wildcard format rules; and when one location identifier matches one of the specifications, storing, in the index, information associating such location identifier with one or more of the tag words.

3. A method of processing queries that select an electronic document from among a plurality of documents, the method comprising the steps of:

storing a tag word in an index in association with information identifying the electronic document, in which the tag word indicates that access to the electronic document is restricted;

receiving a search query that requests the electronic document;

modifying the search query to create a modified search query by adding a search term that references the tag word; and creating a set of search results by searching the index based on the modified search query;

wherein the step of storing further includes the steps of:

receiving specifications of one or more of the documents that are indexed in the index, in which each of the specifications is associated with the tag word, and in which each of the specifications is expressed in a wildcard format;

retrieving a location identifier of each of the documents that are indexed in the index;

matching each location identifier to each of the specifications; and when one location identifier matches one of the specifications, storing, in the index, information associating such location identifier with the tag word.

4. A method of processing queries that select an electronic document from among a plurality of documents, the method comprising the steps of:

storing a tag word in an index in association with information identifying the electronic document, in which the tag word indicates that access to the electronic document is restricted;

receiving a search query that requests the electronic document;

modifying the search query to create a modified search query by adding a search term that references the tag word; and creating a set of search results by searching the index based on the modified search query;

wherein the step of storing includes the steps of:

receiving specifications of one or more of the documents that are indexed in the index, in which each of the specifications is associated with the tag word, and in which one of the specifications is expressed in a wildcard format;

retrieving a location identifier of each of the documents that are indexed in the index;

matching each location identifier to each of the specifications by interpreting the one of the specifications that is in the wildcard format according to one or more wildcard format rules; and when one location identifier matches one of the specifications, storing, in the index, information associating such location identifier with the tag words.

5. A method of processing queries that select an electronic document from among a plurality of documents, the method comprising the steps of:

storing a tag word in an index in association with information identifying the electronic document, in which the tag word indicates that access to the electronic document is restricted;

receiving a search query that requests the electronic document;

modifying the search query to create a modified search query by adding a search term that references the tag word; and creating a set of search results by searching the index based on the modified search query;

wherein the step of storing includes the steps of:

receiving data that indicates one or more tag words and criteria to be used to determine which of the plurality of documents should be associated with each of the one or more tag words, and in which at least a portion of the data is expressed in a wildeard format;

retrieving a location identifier of each of the documents that are indexed in the index;

matching each location identifier to each of the criteria; and when one location identifier matches one of the criteria, storing, in the index, information associating such location identifier with one or more of the tag words.

6. A method of constructing an index of a plurality of electronic documents for use in selecting electronic documents from among the plurality of electronic documents, the method comprising the steps of:

receiving data that indicates one or more tag words and criteria to be used to determine which of the plurality of documents should be associated with each of the one or more tag words, wherein the tag words do not appear in a content of the electronic documents;

storing a list of words that are within one document of the plurality of documents;

storing, in the index, information associating each of the one or more tag words with the one document when the one document satisfies the criteria associated with the tag words;

wherein the step of receiving data includes the steps of receiving data that indicates one or more tag words and criteria to be used to determine which of the plurality of documents should be associated with each of the one or more tag words, and in which at least a portion of the data is expressed in a wildcard format; and wherein the step of storing information comprises the steps of retrieving a location identifier of each of the documents; matching each location identifier to each of the criteria; and when one location identifier matches one of the criteria, storing, in the index, information associating such location identifier with one or more of the tag words.

7. A method of constructing an index of a plurality of electronic documents for use in selecting electronic documents from among the plurality of electronic documents, the method comprising the steps of:

receiving data that indicates one or more tag words and criteria to be used to determine which of the plurality of documents should be associated with each of the one or more tag words, wherein the tag words do not appear in a content of the electronic documents;

storing a list of words that are within one document of the plurality of documents;

storing, in the index, information associating each of the one or more tag words with the one document when the one document satisfies the criteria associated with the tag words;

wherein the step of receiving data includes the steps of receiving specifications of one or more of the documents that are indexed in the index, in which each of the specifications is associated with one or more tag words, and in which one of the specifications is expressed in a wildcard format;

and wherein the step of storing information comprises the steps of:

retrieving a location identifier of each of the documents that are indexed in the index;

matching each location identifier to each of the specifications by interpreting the one of the specifications that is in the wildeard format according to one or more wildcard format rules; and when one location identifier matches one of the specifications, storing, in the index, information associating such location identifier with one or more of the tag words.

8. A method of constructing an index of a plurality of electronic documents for use in selecting electronic documents from among the plurality of electronic documents, the method comprising the steps of:

receiving data that indicates one or more document property values and criteria to be used to determine which of the plurality of documents should be associated with each of the one or more document property values, wherein the document property values do not appear in a content of the electronic documents;

storing a list of words that are within one document of the plurality of documents; and storing, in the index, information associating each of the one or more document property values with the one document when the one document satisfies the criteria associated with the document property values.

9. A method of selecting electronic documents from among a plurality of electronic documents, the method comprising the steps of:

storing a document property value in an index in association with information identifying an electronic document, in which the document property value comprises data that does not appear in a content of the electronic document;

receiving a search query;

modifying the search query to create a modified search query by adding to the search query a search term that references the document property value; and creating a set of search results by searching the index based on the modified search query.

10. A computer-readable medium carrying instructions for selecting electronic documents from among a plurality of electronic documents, the computer-readable medium comprising instructions for performing the steps of:

storing a tag word in an index in association with information identifying an electronic document, in which the tag word comprises data that does not appear in a content of the electronic document;

receiving a search query;

modifying, the search query to create a modified search query by adding to the search query a search term that references the tag word; and creating a set of search results by searching the index based on the modified search query;

wherein the step of storing includes the steps of:
receiving data that indicates one or more tag words and criteria to be used to determine which of the plurality of documents should be associated with each of the one or more tag words, and in which at least a portion of the data is expressed in a wildcard format;
retrieving a location identifier of each of the documents that are indexed in the index;
matching each location identifier to each of the criteria; and
when one location identifier matches one of the criteria, storing, in the index, information associating such location identifier with one or more of the tag words.

11. A computer-readable medium carrying instructions for selecting electronic documents from among a plurality of electronic documents, the computer-readable medium comprising instructions for performing the steps of:

storing a tag word in an index in association with information identifying an electronic document, in which the tag word comprises data that does not appear in a content of the electronic document;

receiving a search query;

modifying the search query to create a modified search query by adding to the search query a search term that references the tag word; and creating a set of search results by searching the index based on the modified search query;

wherein the step of storing includes the steps of
receiving specifications of one or more of the documents that are indexed in the index, in which each of the specifications is associated with one or more tag words, and in which one of the specifications is expressed in a wildcard format;
retrieving a location identifier of each of the documents that are indexed in the index;
matching each location identifier to each of the specifications by interpreting the one of the specifications that is in the wildcard format according to one or more wildcard format rules; and
when one location identifier matches one of the specifications, storing, in the index, information associating such location identifier with one or more of the tag words.

12. A computer-readable medium carrying instructions for processing queries that select an electronic document from among a plurality of documents, the computer-readable medium carrying instructions for performing the steps of:

storing a tag word in an index in association with information identifying the electronic document, in which the tag word indicates that access to the electronic document is restricted;

receiving a search query that requests the electronic document;

modifying the search query to create a modified search query by adding a search term that references the tag word; and creating a set of search results by searching the index based on the modified search query;

wherein the step of storing further includes the steps of:
receiving specifications of one or more of the documents that are indexed in the index, in which each of the specifications is associated with the tag word, and in which each of the specifications is expressed in a wildcard format;
retrieving a location identifier of each of the documents that are indexed in the index;
matching each location identifier to each of the specifications; and
when one location identifier matches one of the specifications, storing, in the index, information associating such location identifier with the tag word.

13. A computer-readable medium carrying instructions for processing queries that select an electronic document from among a plurality of documents, the computer-readable medium comprising instructions for performing the steps of:

storing a tag word in an index in association with information identifying the electronic document, in which the tag word indicates that access to the electronic document is restricted;

receiving a search query that requests the electronic document;

modifying the search query to create a modified search query by adding a search term that references the tag word; and creating a set of search results by searching the index based on the modified search query;

wherein the step of storing includes the steps of:
receiving specifications of one or more of the documents that are indexed in the index, in which each of the specifications is associated with the tag word, and in which one of the specifications is expressed in a wildcard format;

retrieving a location identifier of each of the documents that are indexed in the index;

matching each location identifier to each of the specifications by interpreting the one of the specifications that is in the wildcard format according to one or more wildcard format rules; and when one location identifier matches one of the specifications, storing, in the index, information associating such location identifier with the tag words.

14. A computer-readable medium carrying instruction for processing queries that select an electronic document from among a plurality of documents, the computer-readable medium comprising instructions for performing the steps of:

storing a tag word in an index in association with information identifying the electronic document, in which the tag word indicates that access to the electronic document is restricted;

receiving a search query that requests the electronic document;

modifying the search query to create a modified search query by adding a search term that references the tag word; and creating a set of search results by searching the index based on the modified search query;

wherein the step of storing includes the steps of:

receiving data that indicates one or more tag words and criteria to be used to determine which of the plurality of documents should be associated with each of the one or more tag words, and in which at least a portion of the data is expressed in a wildcard format;

retrieving a location identifier of each of the documents that are indexed in the index;

matching each location identifier to each of the criteria; and when one location identifier matches one of the criteria, storing, in the index, information associating such location identifier with one or more of the tag words.

15. A computer-readable medium carrying instructions for constructing an index of a plurality of electronic documents for use in selecting electronic documents from among the plurality of electronic documents, the computer-readable medium comprising instructions for performing the steps of:

receiving data that indicates one or more tag words and criteria to be used to determine which of the plurality of documents should be associated with each of the one or more tag words, wherein the tag words do not appear in a content of the electronic documents;

storing a list of words that are within one document of the plurality of documents;

storing, in the index, information associating each of the one or more tag words with the one document when the one document satisfies the criteria associated with the tag words;

wherein the step of receiving data includes the steps of receiving data that indicates one or more tag words and criteria to be used to determine which of the plurality of documents should be associated with each of the one or more tag words, and in which at least a portion of the data is expressed in a wildcard format;

and wherein the step of storing information comprises the steps of retrieving a location identifier of each of the documents; matching each location identifier to each of the criteria; and when one location identifier matches one of the criteria, storing, in the index, information associating such location identifier with one or more of the tag words.

16. A computer-readable medium carrying instructions for constructing an index of a plurality of electronic documents for use in selecting electronic documents from among the plurality of electronic documents, the computer-readable medium carrying instructions for performing the steps of:

receiving data that indicates one or more tag words and criteria to be used to determine which of the plurality of documents should be associated with each of the one or more tag words, wherein the tag words do not appear in a content of the electronic documents;

storing a list of words that are within one document of the plurality of documents;

storing, in the index, information associating each of the one or more tag words with the one document when the one document satisfies the criteria associated with the tag words;

wherein the step of receiving data includes the steps of receiving specifications of one or more of the documents that are indexed in the index, in which each of the specifications is associated with one or more tag words, and in which one of the specifications is expressed in a wildcard format;

and wherein the step of storing information comprises the steps of:

retrieving a location identifier of each of the documents that are indexed in the index;

matching each location identifier to each of the specifications by interpreting the one of the specifications that is in the wildcard format according to one or more wildcard format rules; and when one location identifier matches one of the specifications, storing, in the index, information associating such location identifier with one or more of the tag words.

17. A computer-readable medium carrying instructions for constructing an index of a plurality of electronic documents for use in selecting electronic document from among the plurality of electronic documents, the computer-readable medium comprising instructions for performing the steps of:

receiving data that indicates one or more document property values and criteria to be used to determine which of the plurality of documents should be associated with each of the one or more document property values, wherein the document property values do not appear in a content of the electronic documents;

storing a list of words that are within one document of the plurality of documents; and storing, in the index, information associating each of the one or more document property values with the one document when the one document satisfies the criteria associated with the document property values.

18. A computer-readable medium carrying instructions for selecting electronic documents from among a plurality of electronic documents, the computer-readable medium comprising instructions for performing the steps of:

storing a document property value in an index in association with information identifying an electronic document, in which the document property value comprises data that does not appear in a content of the electronic document;

receiving a search query;

modifying the search query to create a modified search query by adding to the search query a search term that references the document property value; and creating a set of search results by searching the index based on the modified search query.

* * * * *